United States Patent [19]

Lancaster et al.

[11] Patent Number: 4,529,663
[45] Date of Patent: * Jul. 16, 1985

[54] FLEXIBLE, ASBESTOS-FREE GASKET MATERIAL

[75] Inventors: Robert A. Lancaster, Littleborough; Noel C. McKenzie, Rochdale; Brian Hargreaves, Flixton, all of England

[73] Assignee: T&N Materials Research Limited, Manchester, England

[*] Notice: The portion of the term of this patent subsequent to Jul. 16, 2002 has been disclaimed.

[21] Appl. No.: 601,927

[22] Filed: Apr. 19, 1984

[30] Foreign Application Priority Data

Apr. 27, 1983 [GB] United Kingdom ................. 8311407

[51] Int. Cl.³ .......................... B32B 9/06; B32B 15/04; B65D 53/00
[52] U.S. Cl. ..................................... 428/450; 428/463; 428/464; 428/454; 524/35; 524/431; 524/443; 524/445; 524/449; 524/456; 524/492; 524/538; 277/227; 277/DIG. 6; 162/142; 162/146; 162/181.6; 162/181.8
[58] Field of Search ................. 524/35, 538, 431, 443, 524/47, 445, 449, 456, 447, 492, 606; 106/DIG. 3, DIG. 4, 204; 501/95; 428/237, 283, 454, 450, 463, 464; 277/227, 233, 234, DIG. 6; 162/142, 164.1, 146, 181.6, 181.8

[56] References Cited

U.S. PATENT DOCUMENTS

| | | | |
|---|---|---|---|
| 3,767,211 | 11/1973 | Amphlett | 427/393.5 |
| 4,317,575 | 3/1982 | Cavicchio | 277/227 |
| 4,387,178 | 6/1983 | Tracy et al. | 428/394 |
| 4,423,109 | 12/1983 | Greenman et al. | 428/290 |

Primary Examiner—Joseph L. Schofer
Assistant Examiner—Fred M. Teskin
Attorney, Agent, or Firm—Cushman, Darby & Cushman

[57] ABSTRACT

Non-asbestos flexible sheet material suitable for use in gaskets for the cylinder head of an internal combustion engine is made by dewatering on a water-permeable conveyor a layer of aqueous slurry and compressing and drying the dewatered layer, the aqueous slurry employed being one that contains the following ingredients in the following proportions by dry weight:

| | |
|---|---|
| ball clay | 25–44% |
| calcium silicate of high specific surface area | 15–40% |
| cellulose fibres | 3–15% |
| organic polymer binder | 5–15% |
| fibrillated poly (aromatic amide) fibres | 1–15% |

6 Claims, No Drawings

FLEXIBLE, ASBESTOS-FREE GASKET MATERIAL

This invention relates to flexible sheet material suitable for use in the manufacture of gaskets, particularly gaskets for the cylinder head of an internal combustion engine.

Such material is commonly made from asbestos fibres as the predominant ingredient, cellulose fibres and particles of barytes (as oil-resistant filler), all bound together with a binder, which is usually an organic polymer. The material is made with the use of conventional paper-making machinery such as a Fourdrinier machine, and is in fact often called 'asbestos paper'. In the manufacture of cylinder head gaskets, two lengths of asbestos paper (usually of thickness in the range 0.3–1.3 mm) are drawn from reels and, with a sheet of the metal (e.g. tinplate) which is to form the support element of the gasket between them, are passed between rollers which urge the two paper sheets into engagement with the metal sheet, as by pushing shallow tangs on the metal sheet into the paper. From the composite sheet thus formed blanks are cut in the desired shape.

The present invention provides paper not having a basis of asbestos but with the properties required for use in cylinder head gaskets, and in particular the flexibility and tensile strength to withstand being made up into gaskets without losing its integrity, and the capacity to seal not only against cylinder gases but also against water containing anti-freeze and against oil. Additionally, it is desirable that the gasket should be easily releasable from the cylinder head when the head is removed from the cylinder block.

The non-asbestos flexible sheet material of the invention is made by a conventional paper-making process, but with the employment of an aqueous paper-making slurry of particular ingredients used in particular proportions. The conventional process can be summarised as one in which an aqueous slurry of the various ingredients of the paper is progressively dewatered as a layer on a water-permeable conveyor, and the dewatered layer is subsequently compressed and dried. The new aqueous paper-making slurry employed in the process of the invention contains the following ingredients in the following proportions by dry weight:

| | |
|---|---|
| ball clay | 25–44% |
| calcium silicate of high specific surface area | 15–40% |
| cellulose fibres | 3–15% |
| organic polymer binder | 5–15% |
| fibrillated poly (aromatic amide) fibres | 1–15% |

The ball clay, which is employed in the unfired state, is the ingredient which gives the finished paper its basic cohesiveness combined with flexibility. Additionally, its presence greatly assists the formation of a layer of good 'green strength' on the water-permeable conveyor of the paper making machine.

The function of the cellulose fibres is primarily to assist the formation of a web on the water-permeable conveyor of the paper-making machine. The cellulose fibres are suitably employed at a freeness of 60°–90° Schopper Riegler.

The organic polymer binder is preferably a synthetic rubber, for this improves the flexibility of the finished paper. The synthetic rubber is preferably a nitrile rubber, such as an acrylonitrilebutadiene copolymer, suitably of butadiene content 25–75% by weight.

In preparing the paper the synthetic rubber is incorporated in dispersed form in the aqueous slurry which is progressively dewatered, conveniently by the use of a commercially available latex containing a dispersing agent.

The fibrillated fibres of poly(aromatic amide) or 'aramid' assist formation of a web, but not so effectively as the cellulose fibres. They are, however, much better than cellulose fibres in their capacity to confer strength at the high temperature (280°–300° C.) at which the finished gasket has to operate. A very suitable aramid is poly(p-benzamide), which is available under the trade mark Kevlar. The fibres are used in fibrillated form i.e. with branches extending from a main stem, and because of their branched nature they are ordinarily encountered as fluffy masses or 'pulps' of low bulk density, of the order of 0.1 gram/cm$^3$. Preferably, the aramid forms at least 2% by weight of the paper, and accordingly at least 2% by weight of solids in the slurry from which the paper is formed.

The calcium silicate of high specific surface area ('high' means at least 10 m$^2$/gram) is, we have found, an absorbent for water and oil which retains its effectiveness in the presence of all the other materials of the paper, fibrous or non-fibrous. The calcium silicate is preferably in hydrated form. The sealing properties of the paper against water can be improved by incorporating a wax, such as paraffin wax suitably in an amount of 1–5% by weight of the paper.

The tensile strength of the paper is improved by the inclusion of black iron oxide ($Fe_3O_4$), suitably in an amount of 2–10% by weight. The oxide also helps to prevent movement of the paper under engine bolt pressure at running temperatures.

To improve drainage of the web on the paper-making machine, the aqueous slurry fed to it may contain a mineral wool, in an amount of 1–8% by weight of slurry solids.

The aqueous slurry may also contain a non-fibrous layer silicate mineral, which is suitably mica or chlorite, to impart further heat resistance to the finished paper. A suitable proportion is 2–15% by weight of slurry solids.

The density of the paper produced will ordinarily be in the range 800–1500 kg/m$^3$.

The invention is further illustrated by the following Examples.

EXAMPLE 1

This Example illustrates the preparation of a non-asbestos gasket paper from an aqueous slurry having a solids content of the following composition:

| | % by dry weight |
|---|---|
| cellulose fibres | 10 |
| fibrillated poly (aromatic amide) | 10 |
| ball clay | 35 |
| hydrated calcium silicate | 28 |
| black iron oxide | 5 |
| nitrile rubber | 10 |
| wax | 2 |

A. Preparation of Slurry (i) Lapponia pulp (bleached softwood sulphate pulp) in sheet form was made into an aqueous slurry of solids content about 3% by weight and treated in a disc refiner until its freeness was 80° Schopper Riegler.

(ii) The pulp of i (1 kg dry weight=33 kg wet weight) was added to 113.5 liters of water at 60° C. in a mixing tank, and the diluted pulp was agitated vigorously for 1 minute. There were then successively added, with vigorous stirring:

fibrillated poly(aromatic amide): 50 liters of an aqueous suspension containing 2% by weight of the material sold under the name 'Kevlar pulp'
black iron oxide: 500 g, dispersed in 10 liters of water
ball clay: 3.5 kg (98% passing a sieve of aperture 20 μm; 82% passing a sieve of aperture 2 μm)
hydrated calcium silicate: (CaO, 36.5; $SiO_2$, 48%); 2.8 kg (pH 11; specific surface area BET 40 $m^2$/g; bulk density 0.25 g/$cm^3$)
paraffin/petrolatum emulsion: 200 g (average particle size 1 μm) dry weight in 2 liters of water Finally, there was added a commercially available aqueous acrylonitrile-butadiene copolymer latex (pH 9.5–12; solids content 30–34%; acrylonitrile content of copolymer, 33%) diluted with 5 times its own volume of water.

(iii) The pH of the slurry in the mixer was then reduced to about 4.5 by the addition of paper-makers alum (aluminium sulphate). The supernatant liquid that remained when stirring was stopped was clear, indicating that the dispersed rubber particles of the latex had all been precipitated onto the fibres and the fillers.

Water at 60° C. was then added to bring the total volume of water present to 500 liters, and stirring was continued for 3 minutes.

b. Preparation of Paper

The slurry of A above was made into flexible sheet material in an entirely conventional way, using conventional anionic polyacrylamide flocculating agent and anti-foaming agent, on a Fourdrinier flat wire paper machine, such as is described in chapters 10 and 11 of "Paper and Board Manufacture" by Julius Grant, James H. Young and Barry G. Watson (Publishers; Technical Division, The British Paper and Board Industry Federation, London 1978). The slurry is progressively dewatered as it travels on the water-permeable conveyor of the machine, and the dewatered material is consolidated by pressing between rollers. The sheet material thus formed is dried on heated cylinders, calendered between heated pressure rollers (temperature 130°–150° C.), and wound into reels.

The properties of two flexible sheet materials obtained from the slurry of A were:

| Thickness | mm | 0.43 | 0.74 |
|---|---|---|---|
| Mass/unit area | g/$m^2$ | 580 | 1022 |
| Density | kg/$m^3$ | 1350 | 1381 |
| Tensile strength | | | |
| Machine direction | MPa | 9.3 | 7.3 |
| Cross direction | MPa | 7.2 | 5.0 |
| Compression at 6.89 MPa | % | 4.3 | 5 |
| Recovery from Compression | % | 64 | 65 |

EXAMPLE 2

Following generally the procedure of Example 1, non-asbestos papers were made from an aqueous slurry whose dry solids content differed from that of Example 1 in containing only 5% of fibrillated poly(aromatic amide) instead of 10% by weight, but additionally contained 5% by weight of mineral wool.

The properties of two flexible sheet materials made were:

| Thickness | mm | 0.38 | 0.72 |
|---|---|---|---|
| Mass/Unit area | g/$m^2$ | 487 | 914 |
| Density | kg/$m^3$ | 1281 | 1270 |
| Tensile Strength | | | |
| Machine direction | MPa | 6.2 | 6.5 |
| Cross direction | MPa | 5.2 | 4.8 |
| Compression at 6.89 MPa | % | 9 | 8 |
| Recovery from Compression | % | 63 | 48 |

EXAMPLE 3

Following generally the procedure of Example 1, non-asbestos paper was made from an aqueous slurry whose dry solids content had the composition.

| | % by dry weight |
|---|---|
| cellulose fibres | 8 |
| fibrillated poly (aromatic amide) | 4 |
| ball clay | 33 |
| hydrated calcium silicate | 25 |
| mineral wool | 5 |
| black iron oxide | 5 |
| nitrile rubber | 8 |
| wax | 2 |
| chlorite | 10 |

The properties of the flexible sheet material made were:

| Thickness | mm | 0.68 |
|---|---|---|
| Mass/Unit area | g/$m^2$ | 917 |
| Density | kg/$m^3$ | 1348 |
| Tensile Strength | | |
| Machine direction | MPa | 6.7 |
| Cross direction | MPa | 4.2 |
| Compression at 6.89 MPa | % | 5 |
| Recovery from compression | % | 58 |

We claim:

1. Non-asbestos flexible sheet material made by dewatering on a water-permeable conveyor a layer of aqueous slurry and compressing and drying the dewatered layer, and calendering the dried dewatered layer, the aqueous slurry employed being one that contains the following ingredients in the following proportions by dry weight:

| ball clay | 25–44% |
|---|---|
| calcium silicate of specific surface area of at least 10 $m^2$/gram | 15–40% |
| cellulose fibres | 3–15% |
| organic polymer binder | 5–15% |
| fibrillated poly(aromatic amide) fibres | 1–15%. |

2. Non-asbestos flexible sheet material according to claim 1, in which the slurry also contains 1–5% by dry weight of a wax.

3. Non-asbestos flexible sheet material according to claim 1, in which the slurry also contains 2–10% by dry weight of black iron oxide.

4. Non-asbestos flexible sheet material according to claim 1, in which the slurry also contains 1–18% dry weight of a mineral wool.

5. Non-asbestos flexible sheet material according to claim 1, in which the slurry also contains 2–15% by dry weight of mica or chlorite.

6. A gasket comprising non-asbestos flexible sheet material according to claim 1, secured to a metal support.

* * * * *